Sept. 9, 1930.  R. S. JACOBSEN  1,775,201
CHANGE SPEED FRICTION DRIVE
Filed March 19, 1925   2 Sheets-Sheet 2
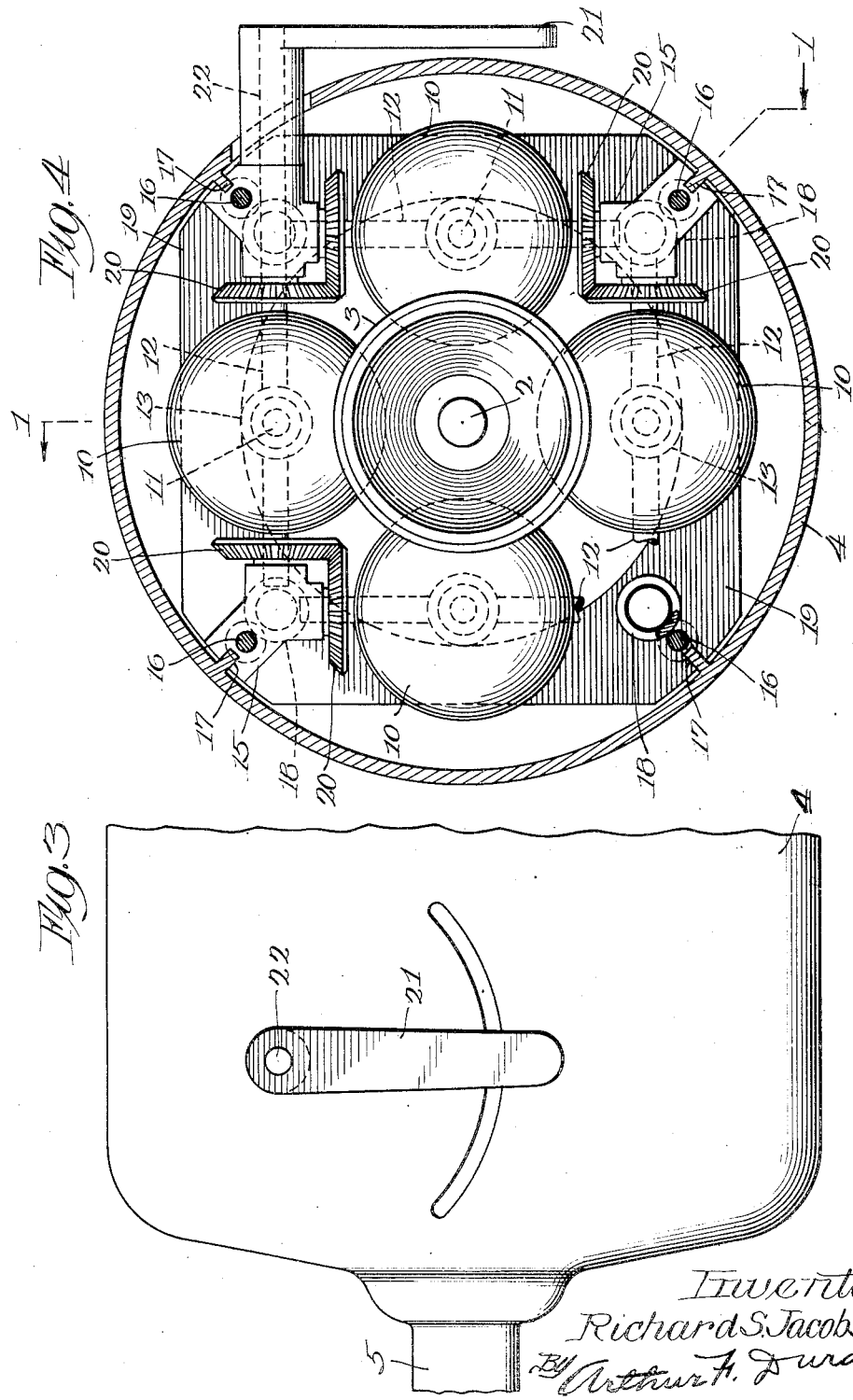

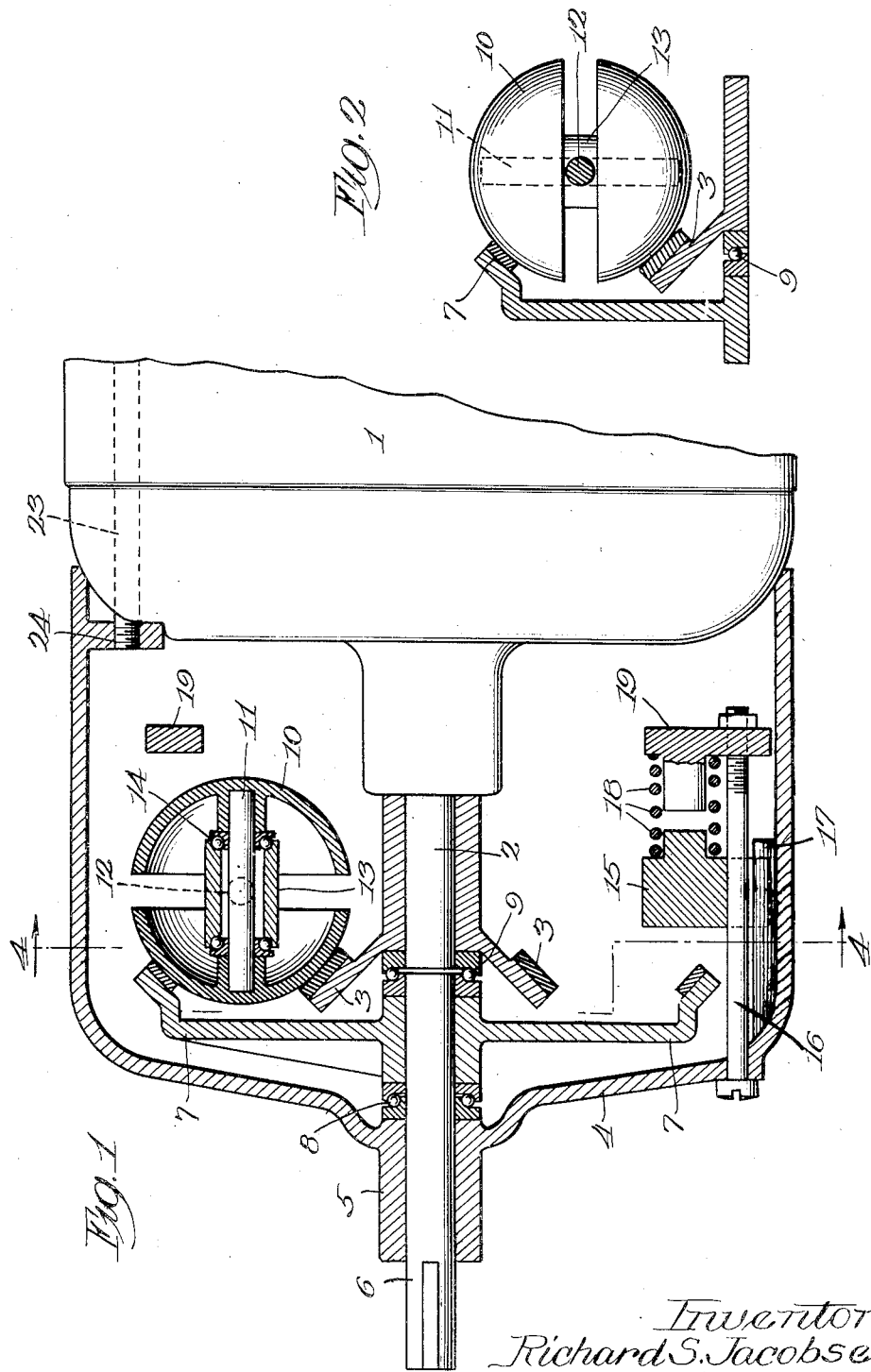

Patented Sept. 9, 1930

1,775,201

UNITED STATES PATENT OFFICE

RICHARD S. JACOBSEN, OF WHEATON, ILLINOIS, ASSIGNOR, BY DIRECT AND MESNE ASSIGNMENTS, TO J. F. S. COMPANY, OF CHICAGO, ILLINOIS, A CORPORATION OF ILLINOIS

CHANGE-SPEED FRICTION DRIVE

Application filed March 19, 1925. Serial No. 16,594.

This invention relates to variable speed driving mechanism, and more particularly to mechanism of this kind having frictional means for transmitting the power, and for changing the speed thereof.

Generally stated, the object of the invention is to provide a novel and improved construction and arrangement whereby friction driving means, of a novel form, as for example one or more spheres or spherical elements having frictional contact with other elements, is employed to change the speed at will.

Another object is to provide a friction drive mechanism of the above described character, having means whereby the drive may be reversed at will.

It is also an object to provide certain details and features of construction and combinations tending to increase the general efficiency and desirability of a friction driving mechanism of this particular character.

To the foregoing and other useful ends, the invention consists in the matters hereinafter set forth and claimed and shown in the accompanying drawings, in which:

Fig. 1 is a longitudinal section of a friction drive variable speed gear involving the principles of the invention;

Fig. 2 is a detail showing one of the spherical friction elements adjusted into position to reverse the drive;

Fig. 3 is an enlarged side elevation of a portion of the outer casing of said mechanism;

Fig. 4 is a transverse section on line 4—4 in Fig. 1.

As thus illustrated, the invention comprises a motor 1, of any suitable character, having its shaft 2 provided with a friction drive pinion 3, of any suitable character, but preferably beveled as shown. The casing or housing 4 provides a bearing 5 in which the short shaft 6 is mounted to rotate, this shaft being provided inside of the housing with a relatively large friction bevel gear 7, as shown. Ball bearings 8 and 9 are preferably provided at the points indicated to sustain the endwise thrust, as will hereinafter more fully appear.

The motor drives the pinion 3, and power is transmitted from this pinion through the balls or spherical elements 10 to the gear 7 previously mentioned. As shown in Fig. 1, the pinion 3 will revolve the balls 10 on their longitudinal axes 11, and this will rotate the friction gear 7 in the same direction. Obviously, by tilting the balls 10 about their transverse axes 12, the longitudinal axes 11 will be tilted, one way or the other, in a way to vary the speed. For example, if the ball shown in Fig. 1 is tilted downward at its left side, the speed of the gear 7 will be increased; but if this ball be tilted upward at its left side, then the speed of the gear 7 will be decreased.

The axes 12 are provided by rock shafts having their middle portions formed with bearings 13 for the axes 11, preferably through the medium of ball bearings 14, so that the parts will all rotate freely and without unnecessary friction. The rock shafts forming the axes 12 have their ends mounted in bearing members 15, which latter are held in place by bolts 16, and are slidable on the guides 17, with coil springs 18 applied in a manner to yieldingly force the balls or spheres 10 against the beveled peripheries of the friction pinion 3 and friction gear 7, previously mentioned. The bolts 16 can be tightened to vary the tension of said springs, in accordance with the load on the driving gear, or in accordance with other circumstances or conditions, it being observed that the bolts extend through the bearing members 15 and into brackets 19 fixed on the inner surface of the casing, the springs 18 being interposed between these brackets and their allotted bearing members.

Bevel gears 20 are employed to connect the axis members 12 together, at their ends, and an outside crank arm 21 is applied to the projecting end portion 22 of one of said axis members 12, whereby adjustment of this crank or hand lever serves to rotate all of the balls or spheres 10 in unison, about their transverse axes 12, thereby to change or vary the speed of the drive.

Furthermore, and by rotation of the handle 21 to the proper extent, the balls or spheres 10 can be made to assume the position shown in Fig. 2, so that their axes 11 will extend radially of the shaft 12, instead of parallel therewith, thereby reversing the drive. Therefore, these bolts or spheres 10 constitute not only a variable friction drive between the pinion 3 and the gear 7, but also constitute a reversing friction drive. In this way, therefore, and merely by adjusting the handle or crank arm 21, the speed of the shaft 6 can be changed or varied, or may be reversed at will.

The casing or housing 4 can be held in position in any desired or suitable manner, as by bolts 23 inserted through the motor and into the internal flange 24 of said casing or housing, or by any other suitable means.

It will be seen that the member 7 provides a beveled raceway for the balls or rolling members 10, and that the member 3 provides a similar raceway, of smaller diameter, the two raceways being concentric and disposed in the same plane, this plane extending at right angles to the axis of rotation of the motor 1 or the shafts 2 and 6 of said structure. Thus the members 3 and 7 are beveled on the same side, or on the side toward the motor 1, and toward one and the same end of the axis of rotation of the motor and change speed friction gear mechanism.

Without disclaiming anything, and without prejudice to any novelty shown and described, what I claim as my invention is:

1. In a change speed friction drive power transmission mechanism, the combination of an annular raceway, a smaller annular raceway, rolling friction members interposed between said raceways, having a variable contact thereon, means forming an axis common to and for supporting said raceways concentrically and substantially in the same plane and for relative rotation about said axis and including an input shaft held against axial displacement and rotatable about said axis and connected to and rotating said smaller raceway to communicate power to said mechanism and an output shaft held against axial displacement and rotatable about said axis, and connected to said first annular raceway and rotated thereby, while said members are rotating about their individual axes to transmit power at a variable speed from said mechanism, spring means exerting pressure in a direction parallel with the axis of said means, to insure pressure contact between said members and raceways, said members forming a medium of power transmission from said input shaft to said output shaft, and means to relatively control said raceways and rolling members by which the raceway contact on each member is under control, thereby to change the speed of transmission.

2. A structure as specified in claim 1, operable for controlling said rolling members in a manner to change the speed of the output shaft.

3. A structure as specified in claim 1, operable for controlling said rolling members into position to reverse the drive.

4. A structure as specified in claim 1, there being a plurality of said friction members disposed at intervals around the peripheries of said raceways, and said mechanism being operable for simultaneously controlling said members in a manner to change the speed of the output shaft, and operative also to reverse the drive.

5. A structure as specified in claim 1, there being a plurality of said friction members disposed at intervals around the peripheries of said raceways, and said mechanism being operable for simultaneously controlling said members in a manner to change the speed of the output shaft and operative also to reverse the drive, said spring means serving to yieldingly force said friction members against the raceways.

6. A structure as specified in claim 1, said raceways being both beveled on the side thereof toward said controlling means.

7. A structure as specified in claim 1, including means to space apart and position said individual axes parallel with said common axis.

Specification signed this tenth day of March, 1925.

RICHARD S. JACOBSEN.